United States Patent Office 3,631,087
Patented Dec. 28, 1971

3,631,087
UNIFORM GRAFTING OF ORGANOPOLYSILOXANES
Richard Newton Lewis and Patrick James Adams, Tecumseh, Mich., assignors to Stauffer-Wacker Silicone Corporation, Adrian, Mich.
No Drawing. Filed Sept. 29, 1969, Ser. No. 862,052
Int. Cl. C08g 47/10; C07f 7/08
U.S. Cl. 260—448.2 E
6 Claims

ABSTRACT OF THE DISCLOSURE

An improved process for grafting organopolysiloxanes which comprises the gradual addition of unsaturated organic monomers to organopolysiloxanes in the presence of free-radical initiators. By this technique, homogeneous unniformly grafted products are obtained. Furthermore, it has been found possible to graft polar monomers which have been difficult or impossible to graft onto organopolysiloxanes heretofore.

---

This invention relates to organopolysiloxanes and more particularly to an improved process for preparing modified organopolysiloxanes.

It is known that organic monomers may be grafted to organopolysiloxanes, but difficulty has often been encountered because of the immiscibility of the organic monomers with the organopolysiloxanes. Because of the immiscibility of these monomers, they have a tendency to homopolymerize with little, if any, grafting on the polysiloxane chain. Even when the monomers are partly or completely miscible, it has been found that they frequently separate upon the initiation of polymerization, which results in the formation of organic homopolymers and solidification of the reaction mass. Furthermore, it is well known that polymerization of unsaturated monomers is exothermic and if the heat of reaction is not removed, the temperature is likely to exceed the desired limit. Where large bulk reactors are used, run-away reactions are likely to ensue. This is particularly true when immiscible and highly polar monomers are used in grafting.

It is therefore an object of this invention to provide a method for uniform grafting of organopolysiloxanes. Another object of this invention is to provide a method for grafting polar organic monomers onto organopolysiloxanes. A further object of this invention is to provide a means for controlling the heat of reaction resulting from the graft polymerization. A still further object of this invention is to provide a method for preparing novel and useful homogeneous modified organopolysiloxanes.

The foregoing objects and others which will become apparent from the following description are accomplished in accordance with this invention, generally speaking, by gradually introducing unsaturated organic monomers to an organopolysiloxane heated to the desired reaction temperature in the presence of a free-radical initiator. The monomer addition may be continuous or intermittent, but the rate of addition should be such that the polymerization temperature will remain substatnially contant.

This invention is based on a novel concept that the gradual addition of monomer will provide for uniform grafting and better temperature control and will substantially reduce the homopolymerization which generally occurs in the presence of a high concentration of monomer.

We have discovered that graft polymerization may be controlled by adding a small amount of monomer simultaneously with the gradual addition of initiator, observing a small rise in temperature followed by a drop in temperature as the monomer is consumed, and repeating the process until the polymerization is essentially complete. Equally good control may be obtained by slow continuous addition of monomer or monomer and initiator, where the steady state concentration of monomer and initiator never exceeds a safe limit.

It will be understood that even with the improvement in the present invention, a certain amount of organic homopolymer is sometimes formed as a by-product. The term "homogeneous product" as used here is meant to indicate a product in which homopolymer, if present, remains in solutions or in such a fine state of dispersion that it has no tendency to settle out. The term "modified organopolysiloxane" is meant to include the entire nonvolatile reaction product including grafted organopolysiloxane, ungrafted organopolysiloxane, if any, and organic homopolymer, if any. The term "uniform grafting" means the process whereby a homogeneous product is obtained.

The grafted organopolysiloxanes consist of an organosiloxane polymer having attached thereto one or more side chains or branches consisting of a carbon-chain polymer. At low levels of grafting, some of the side chains may be short, and occasionally will consist of single monomer units inserted between carbon and hydrogen. These compositions may be prepared by abstracting hydrogen from the organopolysiloxane to form an active site for grafting.

The grafted organopolysiloxanes prepared by the method of this invention correspond to the general formula:

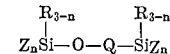

wherein the groups R, which may be the same or different, represent monovalent hydrocarbon radicals and Q represents a siloxane radical of the formula:

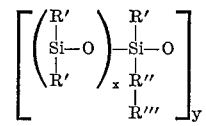

and the groups R', which may be the same or different, represent monovalent hydrocarbon radicals, halogenated monovalent hydrocarbon radicals, or cyanoalkyl radicals; R'' is a divalent hydrocarbon radical; R''' is a polymeric organic radical linked to R'' by a carbon-to-carbon linkage; Z may be a monovalent hydrocarbon radical which may be the same as R or a functional group which may be hydrolyzable or condensable, such as hydrogen, hydroxyl, amino, amido, aminoxy, oximo, halogen, aryloxy, acyloxy, alkoxy, or phosphato; $n$ is a number of from 1 to 3; $x$ is a number from 0 to 20,000; and $y$ is a number from 1 to 500.

The siloxane polymer used in the grafting step should be substatnially free of aliphatic unsaturation and may be represented by the formula:

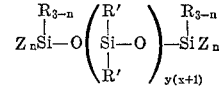

wherein R, R', Z, $n$, $x$ and $y$ are the same as those described above. In the above formula, R and R', which may be the same or different, represent organic radicals, such as alkyl radicals, e.g., methyl, ethyl, propyl, and butyl radicals, and aryl radicals, e.g., phenyl, tolyl, chlorophenyl, and the like.

Examples of suitable organopolysiloxane polymers and copolymers which may be used in the formation of the modified polymers are dimethylpolysiloxanes, copolymers of dimethylsiloxane with methylphenylsiloxane or diphenylsiloxane units, hydroxyl-terminated siloxane fluids, and trialkylsiloxy endblocked polymers, as well as cyclic siloxanes.

The organopolysiloxane should be an easily stirrable liquid at the reaction temperature. Generally, the viscosity should be below about 1000 cs., although with good mixing, viscosities up to 10,000 cp. or more may be handled satisfactorily. Even polysiloxane gums may be grafted with the aid of high-shear mixing equipment. If desired, a solvent with low chain-transfer activity may be added to reduce the viscosity.

The level of grafting may be varied within wide limits. In some cases, perceptible improvement in properties results with as little as 0.1 part of monomer per 100 parts of polysiloxane, although it is generally preferred that at least 0.5 part be used. Even at these low levels, distinctly more uniform products are obtained by gradual addition, especially with the more polar monomers, such as those containing nitrile, amide, or carboxyl groups.

Whether polar or nonpolar monomers are used, it is usually possible to obtain higher levels of grafting by gradual addition. In some cases, as much as 300 parts or more of monomer may be used per 100 parts of organopolysiloxane to give a homogeneous product. In general, however, it is preferred that the monomer be in the range of 0.5 to 200 parts per 100 parts of polysiloxane.

Any polymerizable organic monomer having aliphatic unsaturation may be grafted to the organopolysiloxane polymer. Examples of suitable olefinic monomers are low molecular weight, straight chain hydrocarbons, such as ethylene, propylene, and butylene; vinyl halides, such as vinyl fluoride and vinyl chloride; vinyl esters, such as vinyl acetate; styrene, ring-substituted styrenes and other aromatics, such as vinyl pyridine and vinyl naphthalene; acrylic acid and derivatives of acrylic acid, including the salts, esters, amides, and acrylonitrile; N-vinyl compounds, such as N-vinylcarbazole, N-vinylpyrrolidone, and N-vinylcaprolactam; and vinylsilicon compounds, such as vinyltriethoxysilane.

Disubstituted ethylenes of the type $CH_2=CX_2$ may be used, including vinylidene fluoride, vinylidene chloride, vinylidene cyanide, methacrylic acid and compounds derived therefrom, such as the salts, esters, and amides as well as methacrolein, methacrylonitrile and the like.

The above monomers may be used singly or in combinations of two, three, or more.

Disubstituted ethylenes of the type $CHX=CHX$, such as vinylene carbonate and various monomers which polymerize best in the presence of other monomers, e.g., maleic anhydride, esters of maleic and fumaric acids, stilbene, indene and coumarone, may be used in the formation of the modified polymers.

Suitable initiators are organic peroxides and certain azo compounds in which both the nitrogen atoms of the azo linkage are attached to a tertiary carbon atom and the remaining valences of tertiary carbon atom are satisfied by nitrile, carboxy, cyclo-alkylene, or alkyl radicals, preferably having from 1 to 18 carbon atoms.

Examples of suitable peroxide initiators are compounds of the formula: ROOH, ROOR, RCOOOR, or $(RCOO)_2$ in which R is an organic radical. Specific examples of peroxides which are operative in this invention are hydroperoxides, such as t-butyl hydroperoxides, cumene hydroperoxide, and decalin hydroperoxide; dialkyl peroxides, such as di-t-butyl and dicumyl peroxide; diacyl peroxides, such as benzoyl peroxide; cyclic peroxides, such as ascaridole; peresters, such as t-butyl perbenzoate, t-butyl peroxy isopropyl carbonate and t-butyl peroctoate; keto peroxides, such as acetone peroxide, cyclo-hexanone peroxide, and 1,1-bis-t-butylperoxy-3,3,5-trimethylcyclo-hexane.

The amount of initiator that is employed depends upon the method of addition, temperature of polymerization, reactivity of the monomer, the concentration of monomer, or combinations of these factors. Generally, the amount employed lies between 0.1 and 5.0 percent by weight of the total reactants.

The initiator may be introduced in any of several different ways. Thus, it may be dissolved in the organopolysiloxane prior to addition of the monomer. It may be added separately, either intermittently or continuously, during the monomer addition. Finally, it may be dissolved in and added with the monomer, if the monomer is not subject to polymerization at room temperature. If it is added separately, it is sometimes desirable to dissolve it in an inert solvent. Any solvent used should have a low chain-transfer constant. Suitable solvents include aliphatic and aromatic hydrocarbons, such as n-heptane and toluene, chlorinated aromatic hydrocarbons, such as chlorobenzene, and aliphatic esters, such as ethyl acetate.

Several considerations determine the choice of temperature to be used in the graft polymerization, although generally speaking, temperatures in the range from about 50° to 250° C. will be found suitable. If the initiator is mixed with the organopolysiloxane, a temperature should be chosen such that the initiator has a relatively long half-life, for example from 1 to 10 hours. If the initiator is added intermittently, or simultaneously with the monomer, a temperature should be chosen such that the initiator has a relatively short half-life, for example from one second to one hour, preferably in the range of 30 seconds to 30 minutes. Whatever the temperature, it is sometimes desirable to use a combination of a fast initiator and a slower one.

The modified organopolysiloxanes of this invention have many uses. Those which contain nitrile, carboxy, or amide groups have improved adhesion to metallic surfaces and thus are more suitable as lubricants than unmodified silicones, especially in high-pressure bearings.

Modified organopolysiloxanes containing acid groups are found to have surfactant properties, particularly when neutralized. They are particularly useful in the preparation of aqueous emulsions of silicone oil for deforming applications.

Modified organopolysiloxanes containing terminal hydroxyl groups may be used in application requiring a liquid, room-temperature-vulcanizable material (RTV). Thus, a one-component RTV may be prepared by condensing the OH-polymer with silanes containing more than two reactive groups, e.g., methyltriacetoxysilane or tetraacetoxysilane. Curing then takes place on exposure to atmospheric moisture. An RTV thus prepared from a modified organopolysiloxane is a superior sealant and caulking compound.

A two-component RTV may be prepared by mixing the hydroxyl-terminated modified organopolysiloxane with a curing agent and an appropriate catalyst. Suitable curing agents include polyalkoxysilanes and polyalkoxysiloxanes. Suitable catalysts include tin compounds, for example dibutyltin dilaurate. Such a two-component RTV is useful in weather-resistant exterior coating applications.

Although not essential, fillers may be incorporated in compositions for some commercial applications, in order to provide desirable physical properties. Example of suitable fillers are fumed silicas, high-surface-area preripitated silicas, silica aerogels, as well as coarser silicas, such as diatomaceous earth, crushed quartz and the like. Other fillers which may be used are metallic oxides, such as titanium oxide, boric oxide, zinc oxide; fibrous fillers, such as asbestos, fibrous glass and the like. Additives, such as pigments, antioxidants, ultraviolet absorbers, and the like, may also be included in these compositions.

Various embodiments of this invention are further illustrated by the following examples in which all parts are by weight unless otherwise specified.

EXAMPLE 1

Approximately 80 parts of hydroxyl-terminated dimethylpolysiloxane fluid (viscosity 400 cp.) is added to a reactor and heated with an oil bath to about 131±3° C. A mixture containing 120 parts of styrene and 1.2 parts of benzoyl peroxide is added by an additional funnel to the polysiloxane fluid at the rate of about 5 ml. per minute. When all except the last 10 ml. of the benzoyl peroxide-styrene mixture has been added, about 0.3 part of t-butyl perbenzoate is admixed with the mixture and addition is continued at the rate of about 5 ml. per minute until completed. The temperature is maintained for an additional 20 minutes and then vacuum stripped at about 130° C. at less than 1 mm. Hg for 2 hours, yielding a white viscous polymeric product.

EXAMPLE 2

About 148.2 parts of hydroxyl-terminated dimethylpolysiloxane fluid (viscosity 2,000 cp.) is added to a reactor and heated to about 130±2° C. with an oil bath. A mixture containing 14.4 parts of acrylic acid, 14.4 parts of chlorobenzene, and 0.14 part of benzoyl peroxide is added continuously by an addition funnel by the gradual addition at an average rate of about 1.6 ml. per minute. During this time, the temperature is maintained at 138±2° C. Upon completion of the addition, the reaction product is vacuum stripped at 100° C. at less than 1 mm. Hg for about 2 hours, yielding a white liquid product having a viscosity of about 4,800 centipoise. In a comparison run in which all of the ingredients were mixed at room temperature and heated to 130° C., the reaction temperature was not controllable, and only a solid product was obtained.

EXAMPLE 3

The procedure described in Example 2 was repeated except that 17.2 parts of methacrylic acid was substituted for the acrylic acid. The mixture was added to the reactor at a rate of about 0.83 ml. per minute and the temperature maintained at 127±3° C. The resulting reaction product was vacuum stripped at 120° C. at less than 1 mm. Hg for about 2 hours, yielding a white liquid product having a viscosity of about 6,640 cp. In several comparison runs in which all of the ingredients were mixed at room temperature and heated to 100° C., only greaselike thixotropic products could be obtained, even with as little as 4 percent of methacrylic acid.

EXAMPLE 4

Approximately 60.4 parts of hydroxyl-terminated dimethylpolysiloxane fluid (viscosity 400 cp.) is added to a reactor and heated to 121±2° C. with an oil bath. A mixture containing 80 parts of ethyl acrylate, 10.6 parts of acrylonitrile and 0.91 parts of benzoyl peroxide is added to the polysiloxane fluid by an additional funnel at the rate of about 1 ml. per minute. When all except the last 5 ml. of the ethyl acrylate-acrylonitrile has been added, about 0.23 part of t-butyl perbenzoate is admixed with the mixture and added to the reactor at the same rate. Upon completion of the addition, the temperature is maintained for an additional 30 minutes. The resulting reaction product is vacuum stripped at 100° C. at less than 1 mm. Hg for 2 hours, yielding a cream-colored polymer having a viscosity of about 11,400 cp.

EXAMPLE 5

About 80 parts of hydroxyl-terminated dimethylpolysiloxane fluid (viscosity 400 cp.) is added to a reactor and heated to 115±3° C. with an oil bath. A mixture containing 120 parts of ethyl acrylate and 1.2 parts of benzoyl peroxide is added by an additional funnel to the polysiloxane fluid at the rate of about 1 ml. per minute. After the addition is completed, the temperature is maintained for an additional 15 minutes. The resulting reaction product is vacuum stripped at 100° C. at less than 1 mm. Hg for about 2 hours, yielding a white liquid having a viscosity of about 61,000 cp.

EXAMPLE 6

In a comparison example, a mixture consisting of 80 parts of hydroxyl-terminated dimethylpolysiloxane fluid (viscosity 400 cp.), 120 parts of ethyl acrylate and 1.2 parts of benzoyl peroxide is heated to 115±3° C. with agitation. An uncontrollable reaction ensued as the temperature increased rapidly to 165° C.

EXAMPLE 7

About 200 parts of hydroxyl-terminated dimethylpolysiloxane fluid (viscosity 400 cp.) is added to a reactor and heated to 100° C. with an oil bath. A mixture consisting of 50 parts of methyl acrylate and 0.25 part of t-butyl peroctoate is added to the reactor by an addition funnel at the rate of about 1 ml. per minute. After the addition is completed, the temperature is maintained at 100±2° C. for an additional 15 minutes. The resulting reaction product is vacuum stripped at 100 C. at less than 1 mm. Hg for 2 hours, yielding a white creamy viscous product containing particles of less than 1 micron in size.

EXAMPLE 8

In a comparison example, a mixture consisting of 160 parts of hydroxyl-terminated dimethylpolysiloxane fluid (viscosity 400 cp.) (40 parts of methyl acrylate, 0.2 part of t-butyl peroctoate, and 0.2 part of nitrobenzene is heated to about 80±2° C. and maintained at this temperature for 3 hours. The resulting reaction product is vacuum stripped at 100° C. at less than 1 mm. Hg for 2 hours, yielding a white granular product.

EXAMPLE 9

About 74 parts of dimethyl polysiloxane fluid (viscosity 400 cp.) is added to a reactor and heated to 120±2° C. with an oil bath. A mixture consisting of 33.5 parts of methacrylonitrile and 0.34 part of benzoyl peroxide is added to the reactor by an addition funnel at the rate of about 1 ml. per minute. After the addition is completed, the temperature is maintained for an additional 6 minutes. The resulting reaction product is cooled to about 100° C. and vacuum stripped at this temperature at less than 4 mm. Hg for 2 hours, yielding a slightly pink liquid product having a viscosity of 1,720 cp.

EXAMPLE 10

Approximately 140 parts of dimethylpolysiloxane fluid (viscosity 400 cp.) and 2 parts of t-butyl peroctoate are added to a reactor and heated to 80±2° C. with an oil bath. About 60 parts of styrene is added through an addition funnel to the heated polysiloxane-t-butyl peroctoate mixture over a period of about 3 hours. The resulting reaction product is cooled upon completion of the addition of the styrene and vacuum stripped at 100° C. at less than 1 mm. Hg for 2 hours, yielding a white product having a viscosity of about 12,000 cp.

While specific embodiments of the invention have been described, it should not be limited to the particular compositions. It is intended, therefore, to include all modifications within the spirit and scope of this invention.

The invention claimed is:

1. An improved method for preparing modified organopolysiloxanes having carbon-chain polymers grafted thereto, said carbon-chain polymers being grafted to silicon atoms of the organopolysiloxanes through carbon-to-carbon linkages in which a substantially linear organopolysiloxane containing only monovalent hydrocarbon radicals substantially free of aliphatic unsaturation is contacted with an organic monomer having aliphatic unsaturation, said organic monomer being selected from the class consisting of low molecular weight straight chain hydrocarbons, vinyl halides, vinyl esters, styrene, ring substituted styrenes, acrylic acid, methacrylic acid, salts, esters and amides of acrylic acid and methacrylic acid, acylonitrile and methacrylonitrile, methacrolein and vinyl silicon compounds, in the presence of a free radical initiator, the improvement which comprises gradually adding the organic monomer to a preformed reaction mixture containing the organopolysiloxane and free radical initiator and thereby forming a homogeneous uniformly grafted product.

2. The method of claim 1 wherein the organopolysiloxane contains lower alkyl groups.

3. The method of claim 1 wherein the temperature is maintained between 50° and 250° C.

4. The method of claim 1 wherein 0.5 to 300 parts by weight of monomer are used per 100 parts by weight of organopolysiloxane.

5. The method of claim 1 wherein the free-radical initiator is present in the organopolysiloxane in an amount of from 0.1 to 5.0 percent by weight based on the total weight of the reactants.

6. The method of claim 1 wherein the free-radical initiator is a peroxide.

References Cited

UNITED STATES PATENTS

| | | | |
|---|---|---|---|
| 2,716,128 | 8/1955 | West | 260—827 |
| 2,958,707 | 11/1960 | Warrick | 260—827 |
| 3,418,354 | 12/1968 | Wheeler | 260—827 |
| 3,436,252 | 4/1969 | Neuroth | 260—827 |
| 3,471,588 | 10/1969 | Kanner et al. | 260—827 |

SAMUEL H. BLECH, Primary Examiner

U.S. Cl. X.R.

260—18 S, 23 R, 41 R, 41 A, 41 B, 41 AG, 448.2 R, 448.2 B, 448.2 N, 825, 827